April 27, 1965    C. J. AMATO    3,181,053
REGULATED RECTIFIER INVERTER CIRCUIT
Filed June 15, 1960    2 Sheets-Sheet 1
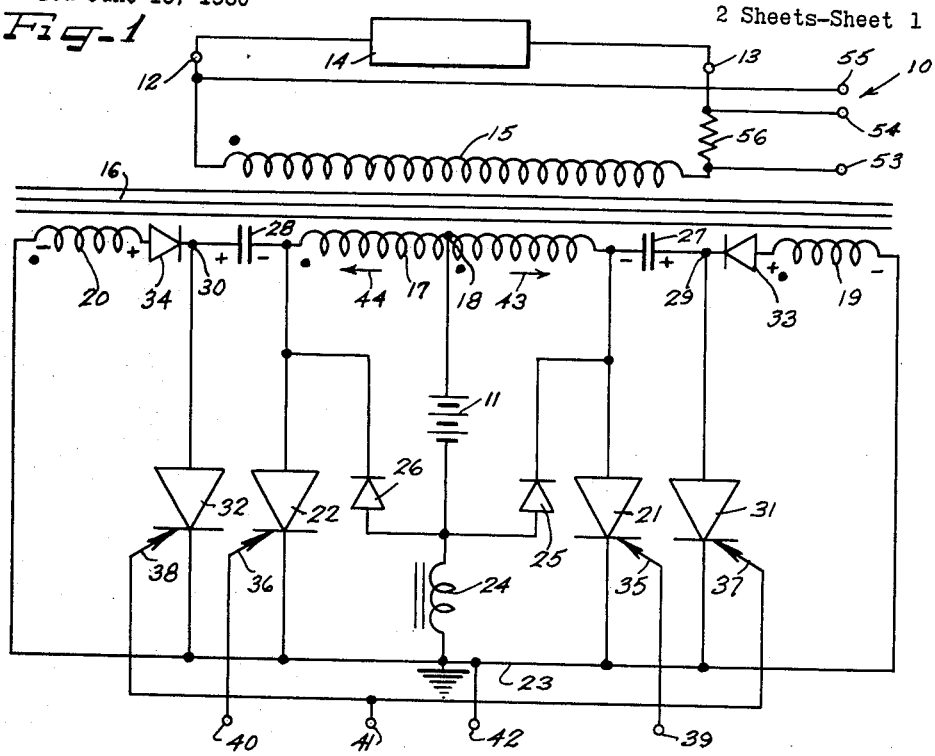
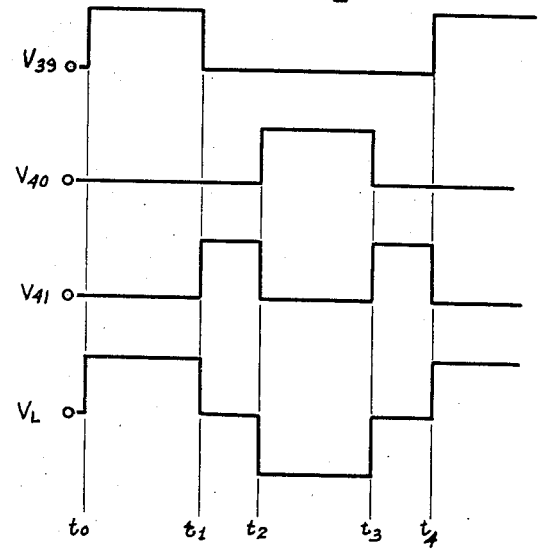
INVENTOR.
Carmelo J. Amato
BY
ATTYS.

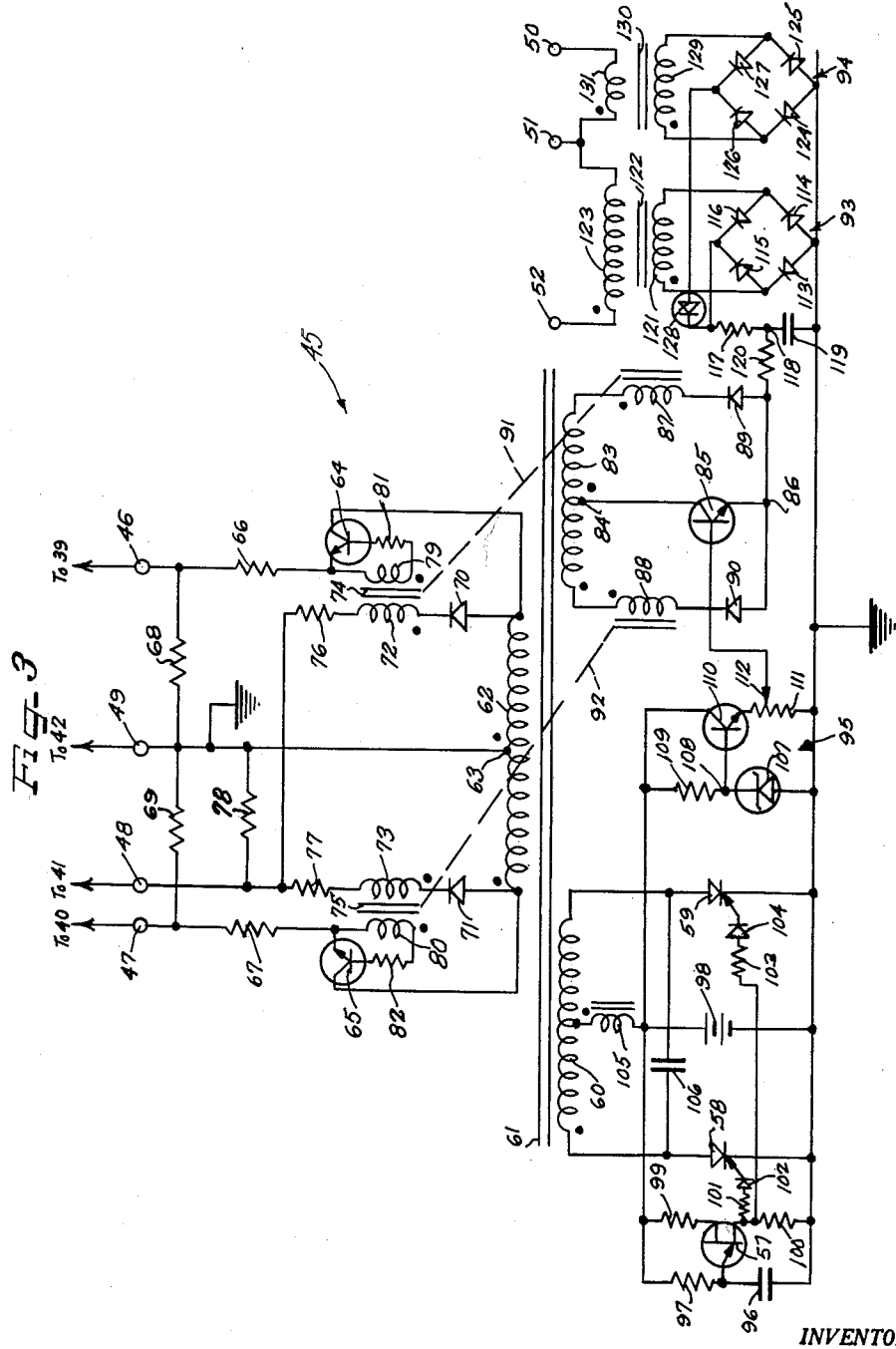

United States Patent Office 3,181,053
Patented Apr. 27, 1965

3,181,053
REGULATED RECTIFIER INVERTER CIRCUIT
Carmelo J. Amato, Shaker Heights, Ohio, assignor to Thompson Ramo Wooldridge Inc., Cleveland, Ohio, a corporation of Ohio
Filed June 15, 1960, Ser. No. 36,282
6 Claims. (Cl. 321—45)

This invention relates to a regulated rectifier inverter circuit and more particularly to a circuit which is especially designed to use silicon controlled rectifiers.

Silicon controlled rectifiers are PNPN devices forming the semiconductor equivalents of gas thyratrons. With such rectifiers, it is possible to control large amounts of power with a very high degree of efficiency. It has many advantages over the power transistor including the ability to operate at higher temperatures, a lower voltage drop at high current and lower control power requirements. However, the inverters heretofore proposed have had a number of limitations. In such inverters, it has not been possible to control the output or in cases where the output has been controllable, buck-boost input regulators or magnetic amplifier output regulators, or the like, have been required to control the output. Both of such systems greatly increase size and weight while decreasing efficiency.

The present invention was evolved with the object of overcoming the limitations or prior rectifier inverter circuits, and particularly to provide a rectifier inverter circuit in which the output can be readily controlled but with a minimum number of component parts, and with high efficiency.

According to this invention, a pair of controlled rectifiers have their anodes connected to the opposite ends of a center-tapped transformer primary winding with their cathodes connected through a direct current source to the center tap. Triggering signals are applied to the gate electrodes of the rectifiers to alternately initiate conduction thereof and control signals are applied in the cathode-anode circuits of the rectifiers to discontinue conduction of each rectifier a certain time interval before triggering of the other. The time interval can be controlled to thus provide a direct control on the inverter output.

An important feature of the invention is in the construction of a circuit arrangement for supplying the control signals to the cathode-anode circuits of the rectifier, in which a minimum number of component parts are required, but in which the control is very precise and in which rugged, trouble-free operation is obtained. Another feature of the invention is in the provision of a circuit arrangement such that its operation is not adversely affected by reactive loads. Additional features of the invention relate to the generation of control signals, and the regulation of such control signals in response to the inverter output, to automatically obtain a regulated voltage and to automatically limit current output.

These and other objects, features and advantages of the invention will become more fully apparent from the following detailed description taken in conjunction with the accompanying drawings which illustrate a preferred embodiment and in which:

FIGURE 1 is a schematic diagram of a regulated rectifier inverter circuit constructed in accordance with the principles of this invention;

FIGURE 2 is a graph illustrating the voltage wave forms at certain points of the circuit of FIGURE 1; and FIGURE 3 is a schematic electrical diagram of a circuit used for applying control signals to the circuit of FIGURE 1.

The regulated rectifier inverter circuit of FIGURE 1, generally designated by reference numeral 10, is operated from a battery 11 (or other direct current source) and is used for developing an A.C. voltage at output terminals 12 and 13, which may be connected to a load generally indicated by reference numeral 14. The output terminals 12 and 13 are connected to a secondary winding 15 of a transformer 16 having a primary winding 17, center-tapped at 18, and also having auxiliary windings 19 and 20.

The end terminals of the primary winding 17 are connected to anodes of a pair of silicon controlled rectifiers 21 and 22 having cathodes connected to a grounded bus 23. The positive terminal of the battery 11 is connected to the center tap 18 of the primary winding 17 and its negative terminal is connected to ground through an inductor 24. A pair of diodes 25 and 26 are connected between the anodes of the rectifiers 21 and 22 and the negative terminal of the battery 11.

The end terminals of the primary winding 17 are also connected through capacitors 27 and 28 to circuit points 29 and 30 which are connected to the anodes of another pair of rectifiers 31 and 32 having cathodes connected to the grounded bus 23. Circuit points 29 and 30 are also connected through diodes 33 and 34 to terminals of the auxiliary windings 19 and 20, the other terminals of the windings 19 and 20 being connected to ground.

The rectifiers 21, 22, 31 and 32 are silicon controlled rectifiers which are PNPN devices forming the semiconductor equivalents of gas thyratrons. Gate electrodes 35, 36, 37 and 38 are provided on the rectifiers 21, 22, 31 and 32 respectively, the gate electrodes forming the equivalent of the grid of a gas thyratron. In operation, with reverse voltage impressed on the rectifier, i.e. with the cathode positive, it will block the flow of current until the avalanche voltage is reached as in ordinary rectifier. With positive voltage applied to the anode, the flow is blocked until the forward breakover voltage is reached. At this point, the device goes into a high conduction state and the voltage thereacross drops to one or two volts. In the high conduction state, the current flow is limited only by the external circuit impedance and supply voltage. At anode to cathode voltages less than the breakover voltage, the device can be switched into the high conduction mode by a small pulse applied from the gate electrode to the cathode. Once the device is in the high conduction state, it will continue conduction indefinitely after removal of the gate signal until the anode current is interrupted or diverted for a short time interval after which the device regains its forward blocking capabilities.

To control the conduction of the rectifiers, control signals are applied to a pair of terminals 39 and 40, connected to the gate electrodes 35 and 36 of the rectifiers 21 and 22, and to a terminal 41, connected to the gate electrodes 37 and 38 of the rectifiers 31 and 32. The control signals are supplied from the circuit illustrated in FIGURE 3, to be described hereinafter, a grounded terminal 42 being provided for connection to the ground of the signal supply circuit.

FIGURE 2 illustrates the form of the voltages applied to the terminals 39, 40 and 41, and also illustrates the form of the voltage developed at the output terminals 12, 13, applied to the load 14.

As shown in FIGURE 2, the control voltage $v_{39}$ applied to the terminal 39 shifts from zero to a certain positive value at a time $t_0$. This signal, applied to the gate 35 of the rectifier 21 causes the rectifier 21 to conduct and causes current flow through the right-hand portion of the primary winding 17, as indicated by the arrow 43. At this time, a certain output voltage is developed across the transformer secondary 15, the magnitude of which is determined primarily by the transformer turns ratio and the battery voltage.

Conduction of the rectifier 21 continues until time $t_1$. During this interval of conduction of rectifier 21, a voltage is developed by the auxiliary winding 19 having a polarity as indicated on the drawing, which is applied through the diode 33 to the capacitor 27, charging the capacitor 27 with a polarity as indicated on the drawing.

At time $t_1$, the voltage at the control terminal 41 shifts from zero to a certain positive value. This voltage, applied to the gate electrode of the rectifier 31, initiates conduction of the rectifier 31. The voltage of the circuit point 29 then drops to a value close to ground potential, and a negative potential is developed at the anode of the rectifier 21, to prevent conduction through the rectifier 21. The output voltage then becomes zero and remains zero until time $t_2$.

At time $t_2$, the voltage at the input terminal 40 shifts from zero to a positive value and this voltage, applied to the gate electrode 36 of the rectifier 22, causes conduction of the rectifier 22. Current then flows from the battery 11 through the left-hand portion of the primary winding 17 in the direction of the arrow 44. An output voltage is then developed, having a polarity opposite to that developed during the time interval $t_0-t_1$. From time $t_2$ to time $t_3$, conduction through the rectifier 22 continues and the capacitor 28 is charged to a polarity as indicated through the diode 34 and the auxiliary winding 20, which develops a voltage having a polarity as indicated.

At time $t_3$, the voltage at the terminal 41 shifts from zero to a positive value. This voltage, applied to the gate electrode 38 of the rectifier 32, initiates conduction of the rectifier 32. Through the capacitor 28, the rectifier 22 is cut off.

At time $t_4$, the voltage of the terminal 39 again shifts from zero to a certain positive value, and the cycle begins to repeat itself.

This circuit has important advantages. Large outputs can be produced with a high degree of efficiency, and can be readily and precisely controlled by controlling the dwell angle, i.e. the ratio of the time intervals $t_1-t_2$ and $t_3-t_4$ to the duration of one cycle, $t_0-t_4$. And it is found that the circuit can provide the proper output under widely varying input and load conditions. The rectifiers 31, 32 in circuit with the capacitors 27, 28, diodes 33, 34 and windings 19, 20 insure that the rectifiers 21, 22 are cut off at precisely the proper times. The circuit is readily adaptable to automatic control in response to the output of suitable voltage and current monitoring circuits, one form of automatic control circuit being illustrated in FIGURE 3 as described hereinafter. The dwell angle can be made very close to 180° so that the output voltage can be reduced to a small fraction of its nominal value.

In addition, the circuit is comparatively simple, has a minimum number of parts and can occupy a small space. At the same time, it is rugged and reliable in operation.

A still further advantage of the circuit is that its operation is not adversely affected by reactive loads. For example, if the load 14 is such that there is a lagging current at time $t_1$, the auxiliary winding 20 in conjunction with the diode 34 and the rectifier 32 allow such current to flow. This is due to the fact that the control voltage from the terminal 41 is applied to the gate electrodes of both rectifiers 31 and 32 simultaneously. And, since the circuit is symmetrical, a similar action takes place at time $t_3$. If there should then be a lagging current, the auxiliary winding 19 in conjunction with the diode 33 and the rectifier 31 will allow such current to flow. In this manner, the circuit presents substantially zero impedance as well as substantially zero voltage in the "off" portions of the output wave form. This is highly important since the circuit might otherwise present a high impedance with respect to a lagging current in the "off" portions of the output wave form, which would be limited only by charging of the battery.

It should be further noted that if the power factor of the load is such that current is still flowing in the direction corresponding to the previous polarity of the output voltage at the time of the switching action, current will flow through one or the other of the diodes 25, 26. Such current may flow through diode 26 at time $t_2$, or through diode 25 at time $t_4$.

Referring now to FIGURE 3, reference numeral 45 generally designates a circuit which will generate the required signals for control of the circuit 10 of FIGURE 1. The circuit 45 has output terminals 46 and 47 for connection to the terminals 39 and 40 of the circuit 10, an output terminal 48 for connection to the terminal 41, and a grounded terminal 49 for connection to the grounded terminal 42 of the circuit 10.

The circuit 45 is particularly designed to respond to voltage and current signals from the circuit 10, to automatically control the control signals in a manner such as to maintain the output voltage substantially constant and to limit the output current. For this purpose, terminals 50, 51 and 52 of the circuit 45 are respectively connected to terminals 53, 54 and 55 of the circuit 10 of FIGURE 1. Terminals 53 and 54 are connected across a resistor 56 in series between one end of the secondary winding 15 and the output terminal 13, so that a current signal is developed between terminals 53 and 54, which is applied to the terminals 50 and 51 of the circuit 45. Terminals 54 and 55 are respectively connected to the output terminals 13 and 12, so that a voltage signal is applied to the terminals 51 and 52 of the circuit 45.

In general, the circuit 45 employs a combination of transistor and magnetic amplifier circuitry. Its principal components include a unijunction transistor 57 which operates as a relaxation oscillator, the output of which is applied to a pair of controlled rectifiers 58, 59 operating in a parallel inverter circuit, to develop a square wave voltage in a primary winding 60 of a transformer 61. The transformer 61 has a secondary winding 62 having a center tap connected to the grounded terminal 49, and having end terminals connected to the output terminals 46, 47 through transistors 64, 65 and resistors 66, 67, resistors 68, 69 being connected between terminals 46, 47 and ground.

The end terminals of the transformer 62 are also connected to the output terminal 48 through diodes 70, 71, windings 72, 73 of magnetic amplifier devices 74, 75, and resistors 76, 77. A resistor 78 is connected between terminal 48 and ground. The magnetic amplifier devices 74, 75 have output windings 79, 80 connected to the emitters of transistors 64, 65 and connected to the base electrodes thereof through resistors 81, 82.

The transformer 61 has an additional secondary winding 83 having a center tap 84 connected through a transistor 85 to a circuit point 86, and having end terminals connected to the circuit point 86 through windings 87, 88 and diodes 89, 90. The windings 87, 88 are parts of the magnetic amplifier devices 74, 75 and are inductively coupled to the other windings thereof as diagrammatically indicated by dotted lines 91, 92.

Circuits 93 and 94 respond to voltage and current signals from the output of the circuit 10 to develop a control signal at the circuit point 86. This control signal is compared with a reference signal of adjustable amplitude, developed by a circuit 95.

In the operation of the circuit as thus far described, a square wave voltage is developed in the transformer secondary 62, through the operation of the rectifiers 58, 59 in the parallel inverter circuit, connected to the transformer primary 60 and controlled by the unijunction oscillator transistor 57. At time $t_0$, the right-hand end of the secondary 62 has a positive polarity, and the transistor 64 is conducting, to develop a positive voltage at the output terminal 46. The positive potential at the right-hand end of the secondary 62 is applied to the output terminal 48 through diode 70, winding 72 and resistor 76. However, a negligible voltage is developed at the terminal 48, because the magnetic amplifier 74 is unsaturated and the winding 72 presents a high impedance.

At time $t_1$, the magnetic amplifier device 74 reaches a saturation condition and the control voltage at the winding 79 changes to cut off conduction of the transistor 64, thus dropping the output voltage at terminal 46 to substantially zero. At the same time, the winding 72 offers a very low impedance, and a high positive voltage is applied to the output terminal 48 from the right-hand end of the transformer secondary through the diode 70, the winding 72 and the resistor 76. This condition is maintained until time $t_2$.

At time $t_2$, the square wave voltage developed at the transformer secondary 62 shifts in polarity, and the left-hand end of the winding 62 becomes positive. This positive potential is applied through the transistor 65 and the resistor 67 to the output terminal 47. The voltage at the output terminal 48, is however, of negligible value, due to an unsaturated condition of the magnetic amplifier deivce 75 and a high impedance of the winding 73.

At time $t_3$, the magnetic amplifier device 75 reaches a saturated condition and the winding 73 presents a low impedance, to develop a high positive voltage at the terminal 48. At the same time, the control voltage developed at the winding 80 is changed in value to render the transistor 65 non-conducting. This condition is maintained until time $t_4$ at which time the cycle starts to repeat itself.

Reset fields are applied to the magnetic amplifier devices 74, 75 by the windings 87 and 88 during the "off" conduction times of the respective devices. Thus from time $t_0$ to time $t_2$, a reset voltage is applied to the winding 88 while from time $t_2$ to time $t_4$, a reset voltage is applied to the winding 87.

The magnitudes of the reset voltages control the times $t_1$ and $t_3$ at which the devices 74, 75 reach their respective saturated conditions. Such voltages are, in turn, controlled by the impedance of the transistor 85 which is controlled by an error signal proportional to the difference between the control signal developed by circuits 93, 94 and the reference signal developed by circuit 95.

If, for example, the output of the circuit 10 should increase, the potential of the circuit point 86 is increased thus decreasing the base-emitter voltage of the transistor 85 and thus decreasing its impedance to decrease the reset voltage applied to the windings 87, 88. The magnetic amplifier devices 74, 75 then reach saturation conditions at earlier times to decrease the time intervals $t_0$–$t_1$ and $t_2$–$t_3$ while increasing the time intervals $t_1$–$t_2$ and $t_3$–$t_4$. Thus the dwell angle is increased, and the output of the circuit 10 is decreased.

A reverse action takes place, of course, in response to a decrease in the output of the circuit 10. It will be appreciated that in this way the output of the circuit 10 can be maintained substantially constant. The circuit can also function to reduce the output of the oscillator 10 in response to a current of predetermined magnitude, which is highly desirable as a protective feature. In this connection, it is noted that the circuit can produce a dwell angle very close to 180°, to reduce the output voltage to a small fraction of its nominal value and thereby provide short circuit protection.

The unijunction oscillator circuit is of conventional construction. The emitter of transistor 57 is connected to ground through a capacitor 96 and is connected through a resistor 97 to the positive terminal of a battery 98, the negative terminal of which is connected to ground. One base electrode of the transistor 57 is connected through a resistor 99 to the positive terminal of battery 98. The other base electrode is connected to ground through a resistor 100. It is also connected to the gate electrode of rectifier 58 through a resistor 101 and a diode 102 and to the gate electrode of the rectifier 59 through a resistor 103 and a diode 104.

The cathodes of the rectifiers 58, 59 are connected to ground, while the anodes thereof are connected to the opposite ends of the primary winding 60 which has a center tap connected through an inductor 105 to the positive terminal of battery 98. A commutating capacitor 106 is connected between the anodes of rectifiers 58, 59.

In operation, a control pulse is applied to the gate of rectifier 58 at time $t_0$ sufficient to initiate conduction of the rectifier 58. The capacitor 106 at that time has a charge of a polariy such as to render the rectifier 59 non-conductive, the charge having been applied in the preceding one-half cycle. With conduction of the rectifier 58, a voltage is developed across the primary 60 and the capacitor 106 is charged in an opposite direction. At time $t_2$, the conditions are such as to permit triggering of the rectifier 59 in response to a control pulse applied to the gate electrode thereof from the unijunction oscillator. Upon conduction of the rectifier 59, the rectifier 58 is cut off, through the commutating capacitor 106, and a voltage of the opposite polarity is developed across the transformer primary 60. At time $t_4$, another pulse is applied to the rectifier 58 from the unijunction oscillator and the cycle repeats itself.

The reference signal supply circuit 95 comprises a zener diode 107 connected between ground and a circuit point 108 which is connected through a resistor 109 to the positive terminal of battery 98. Thus a substantially constant voltage is developed at the circuit point 108 through the action of the diode 107, as is well known in the art. Circuit point 108 is connected to the base of a transistor 110 operated as an emitter-follower, the collector thereof being connected to the positive terminal of battery 98 and the emitter thereof being connected to ground through a potentiometer 111. Potentiometer 111 has a movable contact 112 at which the reference signal is developed, contact 112 being connected to the base of the transistor 85.

The control voltage circuit 93 comprises a full wave bridge rectifier including four diodes 113–116. The junction between diodes 113, 114 is connected to ground, while the junction between diodes 115, 116 is connected through a resistor 117 to a circuit point 118 connected to ground through a filter capacitor 119 and connected to the circuit point 86 through a resistor 120. The junction between diodes 113, 115 and the junction between diodes 114 and 116 are connected to opposite ends of a secondary winding 121 of a transformer 122 having a primary winding 123 connected to the terminals 51, 52. It will be appreciated that the output voltage of the full wave bridge rectifier, developed across the capacitor 119, is proportional to the output of the circuit 10. This voltage is used to control the generation of the control signals in the manner as above described.

The current signal developing circuit 94 comprises four diodes 124–127 connected in a bridge rectifier circuit, the junction between diodes 124 and 125 being connected to ground and the junction between diodes 126 and 127 being connected through a diode 128 and through the resistor 117 to the circuit point 118. The junction between diodes 124 and 126 and the junction between diodes 125 and 127 are connected to opposite ends of a secondary winding 129 of a transformer 130 having a primary winding 131 connected to the terminals 50, 51.

It will be appreciated that with the circuit 94, an output voltage is developed proportional to the current output of the circuit 10. When the current reaches a certain value in relation to the voltage output of the circuit 10, the diode 128 can conduct, to increase the control voltage developed at the circuit point 86, to thus decrease the reset voltage applied to the magnetic amplifier devices, and to thus increase the dwell angle of the circuit to reduce the output thereof.

With the circuit 45, it is thus possible to precisely regulate the control signals in a manner such as to automatically obtain a constant output voltage and to limit current output.

It will be understood that modifications and variations may be effected without departing from the spirit and scope of the novel concepts of this invention.

I claim as my invention:

1. In an inverter for connection to a D.C. source to develop an A.C. output, a transformer including a primary winding having a center tap, a pair of controlled rectifiers having first electrodes connected to the opposite ends of said primary winding and second electrodes connected through the D.C. source to said center tap, said rectifiers having gate electrodes for controlling conduction through said rectifiers, means for periodically applying triggering signals to said gate electrodes to alternately initiate conduction of said rectifiers, means including a pair of auxiliary windings on said transformer for developing voltage signals for application to said first and second electrodes of said rectifiers, and means for applying said voltage signals to said rectifiers to discontinue conduction of each rectifier a certain time interval before triggering of the other rectifier.

2. In an inverter for connection to a D.C. source to develop an A.C. output, a transformer including a primary winding having a center tap, a pair of controlled rectifiers having first electrodes connected to the opposite ends of said primary winding and second electrodes connected through the D.C. source to said center tap, said rectifiers having gate electrodes for controlling conduction therethrough, means for periodically applying triggering signals to said gate electrodes to alternately initiate conduction of said rectifiers, a pair of capacitors, means including a pair of auxiliary windings on said transformer for charging said capacitors during conduction of said rectifiers, and means operable at certain time intervals after application of said triggering signals for connecting said capacitors in circuit with said first and second electrodes of said rectifiers to discontinue conduction of each rectifier a certain time interval before triggering of the other rectifier.

3. In an inverter for connection to a D.C. source to develop an A.C. output, a transformer including a primary winding having a center tap, a first pair of controlled rectifiers having first electrodes connected to the opposite ends of said primary winding and second electrodes connected through the D.C. source to said center tap, said rectifiers having gate electrodes for controlling conduction therethrough, means for periodically applying triggering signals to said gate electrodes to alternately initiate conduction of said rectifiers, means including a pair of auxiliary windings on said transformer for developing voltage signals for application to said first and second electrodes of said controlled rectifiers, and means including a second pair of controlled rectifiers for applying said voltage signals to said first and second electrodes of said first pair of controlled rectifiers for discontinuing conduction of each of said first pair of controlled rectifiers a certain time interval before triggering of the other.

4. In an inverter for connection to a D.C. source to develop an A.C. output, a transformer including a primary winding having a center tap, a pair of controlled rectifiers having first electrodes connected to the opposite ends of said primary winding and second electrodes connected through the D.C. source to said center tap, said rectifiers having gate electrodes for controlling conduction therethrough, means for periodically applying triggering signals to said gate electrodes to alternately initiate conduction of said rectifiers, a pair of auxiliary windings on said transformer for developing voltage signals, a pair of capacitors, a pair of diodes for applying said voltage signals to said capacitors, and means for periodically connecting said capacitors in circuit with said first and second electrodes of said controlled rectifiers for discontinuing conduction of each rectifier a certain time interval before triggering of the other rectifier.

5. In an inverter for connection to a D.C. source to develop an A.C. output, a transformer including a primary winding having a center tap, a first pair of controlled rectifiers having first electrodes connected to the opposite ends of said primary winding and second electrodes connected through the D.C. source to said center tap, said rectifiers having gate electrodes for controlling conduction therethrough, means for periodically applying triggering signals to said gate electrodes to alternately initiate conduction of said rectifiers, a pair of auxiliary windings on said transformer, a pair of capacitors connected to said auxiliary windings to be charged therefrom, and means including a second pair of rectifiers for connecting said capacitors to said first and second electrodes of said first pair of rectifiers for discontinuing conduction of each of said first pair of controlled rectifiers a certain time interval before triggering of the other.

6. In an inverter for connection to a D.C. source to develop an A.C. output, a transformer including a primary winding having a center tap, a pair of controlled rectifiers having first electrodes connected to the opposite ends of said primary winding and second electrodes connected through the D.C. source to said center tap, said rectifiers having gate electrodes for controlling conduction therethrough, means for developing a first cyclic control signal changing from a first value to a second value at a time $t_0$ at the beginning of a cycle, then back to its first value at a time $t_1$ and then again to its second value at a time $t_4$ at the beginning of the succeeding cycle, means for developing a second cyclic control signal changing from a first value to a second value at a time $t_2$ and then back to its first value at a time $t_3$, means for developing a third cyclic control signal changing from a first value to a second value at time $t_1$, then back to its first value at time $t_2$, then again to its second value at time $t_3$ and then back to its first value at time $t_4$, the time intervals $t_0$–$t_2$ and $t_2$–$t_4$ being substantially equal, and the time intervals $t_0$–$t_1$ and $t_2$–$t_3$ being substantially equal and being less than the time intervals $t_0$–$t_2$ and $t_2$–$t_4$, means for applying said first and second cyclic control signals to said gate electrodes to alternately initiate conduction of said rectifiers at times $t_0$–$t_2$, and means controlled by said third cyclic control signal for applying signals to said first and second electrodes to discontinue conduction of said rectifiers at times $t_1$ and $t_3$.

References Cited by the Examiner

UNITED STATES PATENTS

| | | | |
|---|---|---|---|
| 2,644,126 | 6/53 | Levy | 321—36 |
| 2,872,635 | 2/59 | Lawn | 321—36 X |
| 3,010,062 | 11/61 | Van Emden | 321—18 |
| 3,027,508 | 3/62 | Johnson | 321—45 X |
| 3,029,376 | 4/62 | Mantenffel | 321—45 X |

OTHER REFERENCES

General Electric Controlled Rectifier Manual, first edition, copyright March 21, 1960, by General Electric.

"Notes on the Application of the Silicon Controlled Rectifier, published by the Semiconductor Products Dept. of General Electric, December 1958, pages 1–75.

LLOYD McCOLLUM, *Primary Examiner.*

SAMUEL BERNSTEIN, MILTON O. HIRSHFIELD, *Examiners.*